Figure 6:
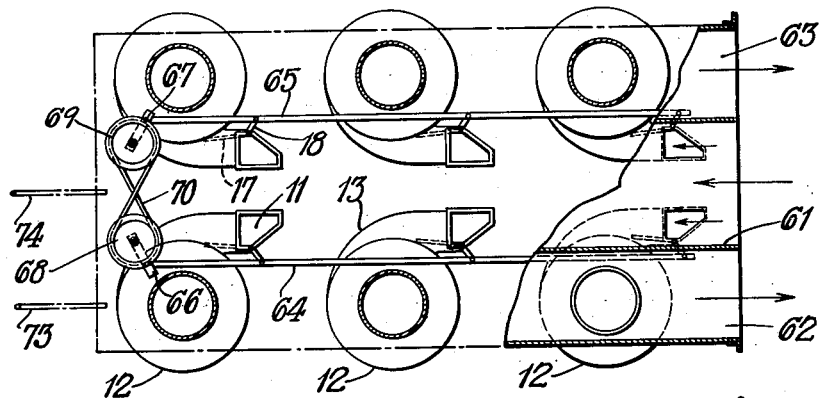

May 31, 1938.  L. C. WHITON, JR  2,119,478
DUST CATCHER
Filed Feb. 12, 1937  3 Sheets-Sheet 1
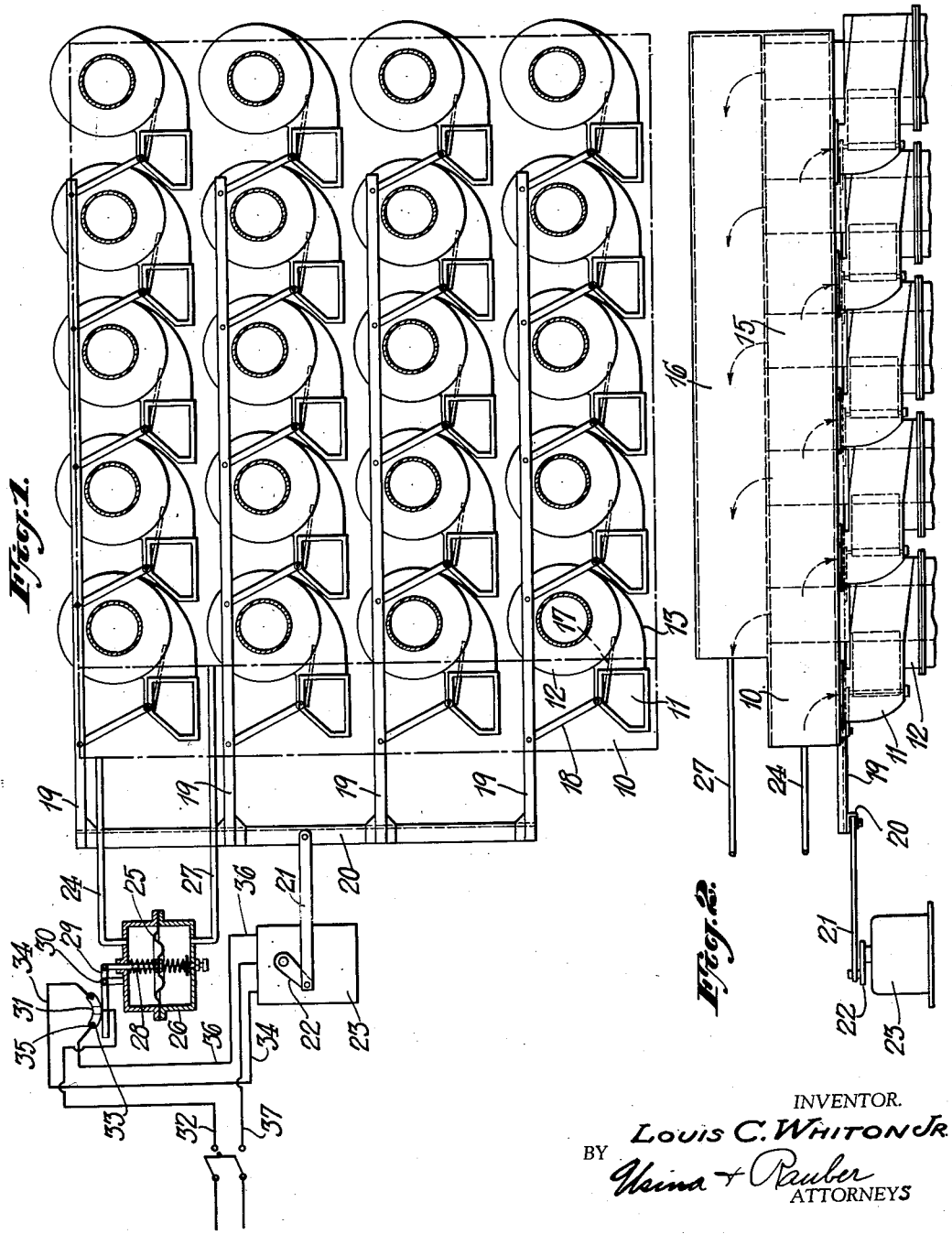
INVENTOR.
Louis C. Whiton Jr.
BY
ATTORNEYS May 31, 1938. L. C. WHITON, JR 2,119,478
DUST CATCHER
Filed Feb. 12, 1937 3 Sheets-Sheet 2
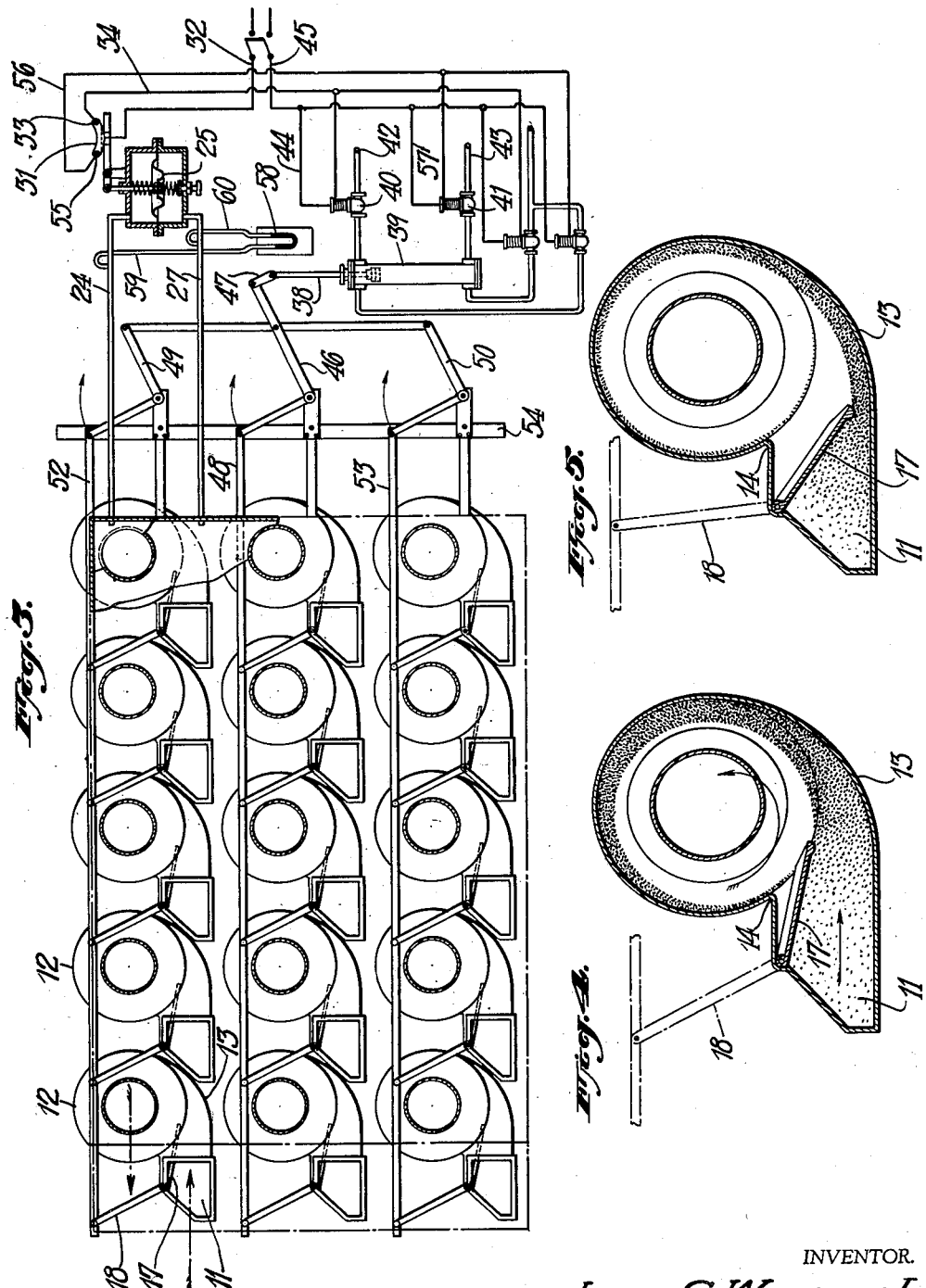
INVENTOR.
Louis C. Whiton Jr.
BY
ATTORNEYS May 31, 1938.  L. C. WHITON, JR  2,119,478

DUST CATCHER

Filed Feb. 12, 1937  3 Sheets-Sheet 3

INVENTOR.
Louis C. Whiton Jr.
BY
ATTORNEYS

Patented May 31, 1938

2,119,478

UNITED STATES PATENT OFFICE 2,119,478

DUST CATCHER

Louis C. Whiton, Jr., Westport, Conn., assignor to Prat-Daniel Corporation, Port Chester, N. Y., a corporation of New York Application February 12, 1937, Serial No. 125,399

5 Claims. (Cl. 183—40)

My invention relates to a method and apparatus whereby particles suspended in a flowing stream of air or other gas are separated by deflecting the gas into a circular or cyclone movement, whereby the particles are thrown centrifugally out of the stream of gas.

In apparatus of this type, the efficiency or effectiveness with which the particles are separated from the gas is governed not alone by the size or magnitude of the circulating current of air, but also by its velocity. If, therefore, the volume of circulating gases varies widely, and the velocity of the gas in the cyclone or circular movement varies accordingly, the efficiency of separation will decrease with the lower velocities.

My invention overcomes this disadvantage and provides a means whereby the efficiency of separation may be maintained or prevented from falling very greatly with alterations in the volume of gases being treated, in my invention, the gas to be treated is passed into a cyclone separator of a size suitable for most efficient separation, in which it is deflected into a circular path by a curving or cylindrical wall which receives the separated particles and permits them to drop out of the stream of gas and then proceeds to the center or vortex and passes upwardly out of the separator. If the volume of gases is too large, I preferably separate it into a number of parallel streams, which pass in parallel through separators of appropriate size. Each separator has at its inlet end a velocity control damper hinged at the side opposite the curving plate in such a manner that it may be swung toward the latter, thus narrowing the inlet passage. All of the separators are controlled simultaneously and equally from a unitary station. The swinging of the damper is so related to the volume of gases as to maintain a constant pressure difference between the inlet and outlet of the separators and thus to maintain a constant velocity through the latter. For example, if the volume of gas supplied to the system should decrease, the cross-sectional area of the inlet is decreased proportionally or until the predetermined pressure difference is re-established, so that the velocity of the gases passing to and in contact with the curved deflecting surface will be maintained.

For this purpose, the pressure difference between the inlet and outlet to the separators is measured and the opening or closing of the damper is controlled, in accordance therewith. This control may be automatic, the pressure difference operating mechanisms to open or close the dampers as the pressure difference rises or falls.

The various features of the invention are illustrated by way of example in the accompanying drawings, in which—

Fig. 1 is a diagrammatic plan view of a separating system embodying a preferred form of my invention; Fig. 2 is an elevation of the upper part of the system shown in Fig. 1; Fig. 3 is a plan view of a modification of the system shown in Fig. 1; Figs. 4 and 5 are respectively horizontal sections of individual cyclone separators showing the control damper in different positions; Fig. 6 is a plan and Fig. 7 an elevation of another form of embodiment of my invention.

Referring more particularly to Figs. 1 and 2, the air or gas in which suspended particles are to be separated is supplied from a chamber 10 through individual inlets 11 to a number of cyclone separators 12 arranged in parallel, so that the gases are divided substantially equally among the separators. Each cyclone separator comprises a curved wall 13 of involute or circular curvature extending tangentially from the inlet 11 and terminating after somewhat less than a complete turn at the opposite or inner side 14 of the inlet, as shown more clearly in Figs. 4 and 5. After passing through the several cyclones, the exhaust gases pass into the central part or vortex of the cyclone separators and thence upwardly outlet passages 15 into an outlet chamber 16.

In each of the inlets 11, to the respective separators, there is pivotally mounted on the side or wall of the inlet opposite that from which the curved wall 13 starts, a damper 17 each of which may be swung by an individual arm 18 to any position between the wide open position shown in Fig. 4 and nearly closed position shown in Fig. 5. In these various positions, the damper will proportion the cross-sectional area of the passage to the volume of gases supplied so as to maintain a predetermined pressure gradient and velocity of gases immediately adjacent the curving wall 13, so that suspended particles may be effectively thrown against the curving wall by centrifugal force.

It is to be noted that in the open position of Fig. 4, the damper 17 is tangent to the circumference of the cyclone separator and swings from this tangent position outwardly toward the wall 13 to restrict the passage. By leaving the space within the cyclone uninterrupted by the damper 17, the circular movement of the gases is not interfered with and the formation of unnecessary eddy currents is avoided. The damper 17 will only be swung counter-clockwise past the position of Fig. 4 in emergencies to permit the passage of an excessive amount of gas when the perfect separation of the suspended particles may be sacrificed to the emergency.

To maintain uniformity in the several separators, the damper swinging arms 15 are all controlled by a single means. The form of this means may vary according to the grouping or arrangement of the separators. In the grouping shown in Fig. 1, in which there are four rows of five separators each, four actuating rods 19, one for each row are provided and are connected at one end to a cross-piece 20. This cross-piece 20 is in turn connected by a link 21 to the crank 22 of a motor 23, which rotates throughout a limited arc in one direction or the other to swing the crank 22 proportionally to the dampers 17.

The motor 23 is rotated in one direction or the other depending upon the difference in pressure between the inlet chamber 10 and the outlet or exhaust chamber 16. For this purpose, the pressure in the inner chamber 10 is transmitted through a pipe 24 to the upper side of a diaphragm 25 in a diaphragm chamber 26, while the pressure in the outlet chamber 16 is transmitted through a pipe 27 to the opposite or underside of the diaphragm 25. The position of the diaphragm will rise or fall in accordance with the variations in pressure transmitted to the opposite sides of the diaphragm. These changes in the height of the diaphragm are transmitted through a connecting rod 28 to one end of a lever 29 pivoted on an upright 30 on the diaphragm chamber and carrying at its other end a three terminal mercury switch 31. Current is supplied from the main 32 to the central terminal of the switch 31. A terminal 33 at one end of the switch is connected through a conductor 34 to one terminal of the motor 23. The terminal 35 at the opposite end of the switch 31 is connected through a conductor 36 to the opposite terminal of the motor 23. It will be apparent that, when the switch is in midposition, both terminals 33 and 35 will be disconnected from the main 32. When the diaphragm 25 falls, the switch 31 will be tilted to connect the main 32 with the terminal 33 and thus through the conductor 34 to the motor 23.

As this drop in the diaphragm is caused by an increase in the pressure difference from the inlet to the outlet, the current supplied through the motor 23 rotates the crank arm 22 to the right to open the dampers 17. When the pressure difference falls, the diaphragm 35 will rise, tilting the switch 31 in the opposite direction and causing current to pass from the main 32 through the terminal 35 and conductor 36 to the opposite terminal of the motor 23 and thus rotate the latter to swing the arm 22 toward the right to move the damper 17 to closed position. Current supplied to the motor 23 returns to the main 37.

The modification shown in Fig. 3 is similar to that of Figs. 1 and 2, except that in this system only three rows of five separators each are shown. The arrangement of diaphragm and switch is similar to that of Figs. 1 and 2, but instead of the motor 23, a piston 38 is operated by pressure fluid supplied to a cylinder 39. The supply and exhaust of pressure fluid to the cylinder 29 is controlled by a pair of electrically operated valves 40 and 41 controlling the supply of fluid through upper and lower pipes 42 and 43, respectively. The opening of the valve 40 is controlled by current supplied from the main 32, to the central terminal of the switch 31 and thence through the end terminal 33 and conductor 34 as in Figs. 1 and 2.

Consequently, when the diaphragm 25 is raised by a drop in the pressure differential between the inlet and outlet, the making of a circuit between the main 32 and a terminal 33 and conductor 34 energizes the valve 40 to admit fluid to the upper part of the piston 38 and to move the latter downwardly. The circuit from the valve 40 is completed through the return wire 44 leading to the return main 45.

As the piston 38 is lowered, it tilts a bell crank lever 46, to one arm of which it is connected by a link 47 and the other arm of which is connected to one of the damper operating rods 48. The construction is such that, as the piston 38 is lowered, the rod 48 is pulled to the right to move the dampers toward closed position. The bell crank lever 46 is connected to a pair of similar bell crank levers 49 and 50 by means of a connecting link 51 and these bell crank levers 49 and 50 in turn operate damper control rods 52 and 53 of the remaining two rows of separators. The bell crank levers 46, 49 and 50 may be mounted on suitable framework 54. When the pressure difference increases so as to lift the diaphragm 25 and tilt the switch 31 to the opposite inclination, circuit is made with the main 32 to the opposite terminal 55, thus supplying current through a conductor 56 to the electric switch 41 from which it returns by a return wire 57 to the main 45.

Pressure fluid is thereupon admitted below the piston 38, lifting the latter and swinging the bell crank levers 46, 49 and 50 and thereby swinging the dampers 17 counter-clockwise to open them still further through the connecting rods 48, 52 and 53.

A manometer 58 is mounted with one of its arms 59 connected to the pipe 24 and the other arm 60 to the pipe 27, so that the pressure difference between the inlet and outlet chambers 10 and 16 may be observed and, if necessary, the apparatus checked or set in accordance therewith. Or, in case of emergency, the damper system may be operated manually in accordance with the manometer readings.

Figure 7:
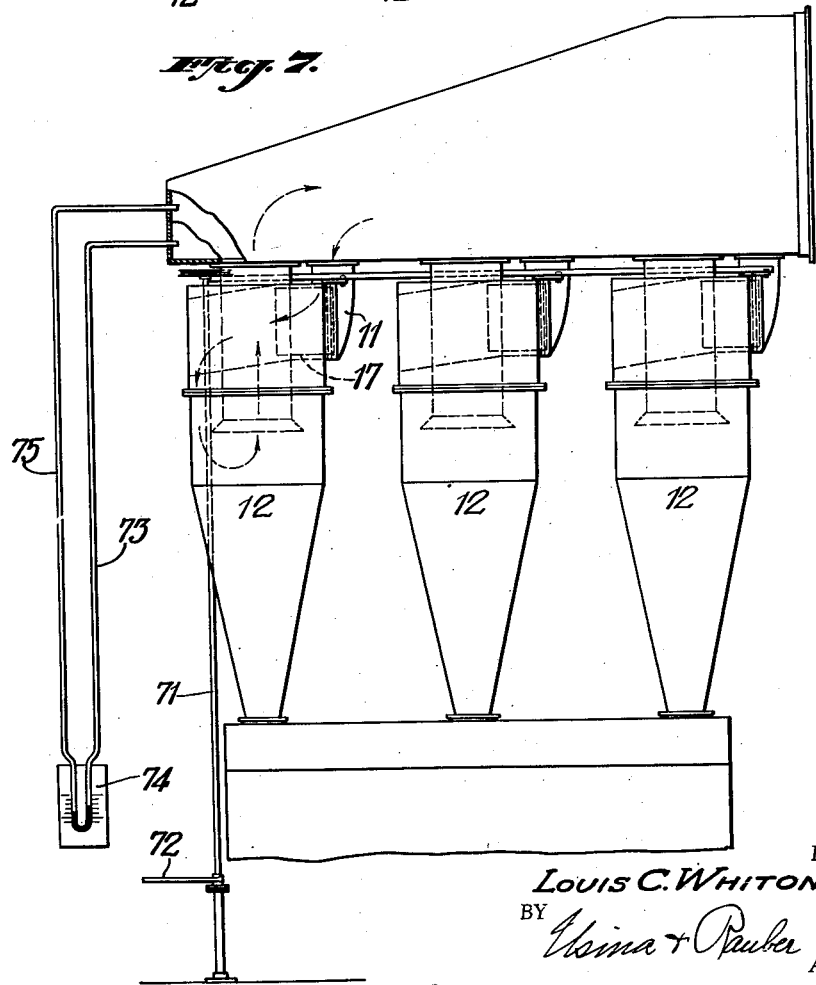

In the apparatus shown in Figs. 6 and 7, the invention is illustrated as applied to a smaller group or battery of separators. In this embodiment of the invention, the gases are supplied to an inlet chamber 61 positioned between a pair of outlet chambers 62 and 63. The separators 12 are arranged in two rows of three each, each row receiving gases from the central inlet chamber 61, one row discharging to the outlet chamber 62 and the other to the outlet chamber 63. For convenience, the separators of one row may be arranged reversely or in mirrored image relation to those of the other.

The arrangement of dampers in the inlets is similar to that of Figs. 1 and 2. These dampers are secured in a manner similar to that of Figs. 1 and 2 to respective operating rods 64 and 65 connected at one end to crank arms 66 and 67 on grooved pulleys 68 and 69, respectively. These pulleys are interconnected by means of a crossbelt 70, so that they rotate in opposite directions, the damper connections being in reverse relation to the respective rods 64 and 65. It will thus be apparent that by rotating either of the pulleys 68 or 69 in one direction or the other both pulleys will be operated simultaneously and equally to swing their respective dampers to the same extent and in the same direction. For this purpose, one of the pulleys 69 is mounted on a manually operable shaft 71 having an operating handle 72 in convenient position.

One arm of a manometer 74 is connected to the outlet chamber 62 and the other arm 75 is connected to the supply chamber 61. This manometer, therefore, shows the difference or drop in pressure from the inlet to the outlet and thus indicates changes in velocity. The operator may, therefore, set the dampers in accordance with a reading of the manometer 74. This enables the separator system to be regulated for periods when it is operated under differing, but substantially constant loads.

Through the above apparatus, I have provided a separating system in which any desired volume of gases may be handled in units of the most efficient size for separating suspended particles and in which the units of the system may each and all be controlled so as to maintain a substantially uniform velocity of gases against the body of the separators and thereby to maintain a consistently high percentage or efficiency of separation.

What I claim is:—

1. Apparatus for separating suspended particles from gases which comprises a plurality of cyclone separators arranged in parallel, a common supply chamber and a common outlet chamber for said separators, a plurality of inlets from said supply chamber to said separators, one for each separator, each inlet having a damper hinged at its leading edge to the inner side of its inlet to control the area of said inlet, means for moving said dampers simultaneously and proportionally, and control means actuated by the difference in pressures between said supply chamber and said outlet chamber to actuate said damper moving means to move the dampers toward or from closed position as the pressure difference between said supply and outlet chambers tends to fall or rise respectively.

2. Apparatus for separating suspended particles from gases which comprises a plurality of cyclone separators arranged in parallel and each having a damper hinged at its leading edge to the inner side of its inlet to swing across the inlet toward and from the tangential surface of the inlet and thus to restrict or enlarge the cross-sectional area of the inlet passage, a common supply chamber and an exhaust chamber for said separators, common actuating means to swing the dampers of said separators simultaneously and proportionally toward or from said cyclone surface, a diaphragm actuated on opposite sides by the pressures in said supply and exhaust chambers and a pair of electric circuits energized alternatively by the movement of said diaphragm in one direction or the opposite and means controlled by said electric circuits to actuate said damper swinging means in opposite directions.

3. Apparatus for separating suspended particles from gases which comprises a plurality of cyclone separators arranged in parallel and each having a curved deflecting surface and an inlet having a damper pivoted at its leading edge to swing toward and from said curved surface to restrict or enlarge the passage of gases thereto, common supply and exhaust conduits for said separators and means controlled by the difference in pressures of gases entering and leaving said cyclones to swing said dampers simultaneously and proportionally toward or from said curved surface.

4. Apparatus for separating suspended particles from gases which comprises a plurality of cyclone separators arranged in parallel, each separator having an inlet, a curved deflecting surface extending from one side of said inlet, a damper pivoted at its leading edge at the opposite side of said inlet to swing across said inlet to or from said curved surface to restrict or enlarge the gas passage through said inlet, a common supply and exhaust for said separators, and common actuating means for swinging said dampers simultaneously and proportionally to maintain constant pressure differences between said supply and said exhaust.

5. The apparatus of claim 1 in which said dampers are entirely within said inlets in various positions of adjustment.

LOUIS C. WHITON, JR.